(12) United States Patent
Olson

(10) Patent No.: US 6,385,024 B1
(45) Date of Patent: May 7, 2002

(54) SYSTEM AND METHOD FOR MONITORING CURRENT CONSUMPTION FROM CURRENT SHARE COMPONENTS

(75) Inventor: Philip D. Olson, Kenwood, CA (US)

(73) Assignee: SS8 Networks, Inc., San Jose, CA (US)

( * ) Notice: Subject to any disclaimer, the term of this patent is extended or adjusted under 35 U.S.C. 154(b) by 0 days.

(21) Appl. No.: 09/519,966

(22) Filed: Mar. 7, 2000

(51) Int. Cl.⁷ .................................................. H02H 3/18
(52) U.S. Cl. ....................................................... 361/87
(58) Field of Search ........................ 361/20–95; 307/43, 307/52, 87; 363/21, 7, 89

(56) References Cited

U.S. PATENT DOCUMENTS

| | | | | |
|---|---|---|---|---|
| 5,390,068 A | * | 2/1995 | Schultz et al. ................. | 361/95 |
| 5,428,523 A | * | 6/1995 | McDonnal .................... | 363/71 |
| 5,592,353 A | * | 1/1997 | Shinohara et al. ............ | 361/63 |
| 5,726,872 A | * | 3/1998 | Vinciarelli et al. ........... | 363/89 |
| 5,745,356 A | * | 4/1998 | Tassitino, Jr. et al. ........ | 363/71 |
| 6,018,203 A | * | 1/2000 | David et al. .................. | 307/52 |
| 6,236,582 B1 | * | 2/2000 | Jalaleddine ................... | 363/72 |
| 6,134,122 A | * | 10/2000 | Chen et al. .................... | 363/21 |
| 6,166,455 A | * | 12/2000 | Li ................................. | 307/43 |

OTHER PUBLICATIONS http://rbelectronics.com/CS880.htm; "CS880 DC Current Censor"; obtained Jan. 20, 2000; 2 pgs.
Texas Instruments; http://www.ti.com/sc/docs/products/analog/uc3902.html; "UC3902, Load Share Controller"; obtained Jan. 20, 2000; 2 pgs.
Linear Technology; http://www.linearcom/cgi–bin/data . . . taSheet.html&name=DataSheet&num=20; "LT1431"; obtained Jan. 21, 2000; 2 pgs.
Laszlo Balogh, Unitrode Corporation; "The UC3902 Load Share Controller and Its Performance In Distributed Power Systems"; 1999, Texas Instruments; 14 pages w/schematics.

* cited by examiner

Primary Examiner—Peter S. Wong
Assistant Examiner—Pia Tibbits
(74) Attorney, Agent, or Firm—Pennie & Edmonds LLP

(57) ABSTRACT

A method for monitoring current in a power supply system including multiple parallel power supplies and current load sharing devices for each power supply. The error voltage generated by the current load sharing devices, in the process of balancing the power supply outputs, is proportional to current provided by a single power supply. The total number of power supplies may be determined by including a small current source with each power supply, and using the current sources to drive a "present" line, the current on this line indicating the number of power supplies present. The error voltage and the present line signal are used by a control circuit that includes analog-to-digital conversion and a CPU to calculate the total current drawn by the supply, and to trigger a circuit breaker if the total current exceeds a predetermined limit.

7 Claims, 4 Drawing Sheets

SYSTEM AND METHOD FOR MONITORING CURRENT CONSUMPTION FROM CURRENT SHARE COMPONENTS

The present invention relates generally to power supply systems, and specifically to monitoring current in a power supply system consisting of parallel power supplies.

BACKGROUND OF THE INVENTION

Large electronic systems frequently use power supply systems consisting of multiple supplies operating in parallel. Multiple power supplies in a distributed power system are often required in order to supply the high level of current drawn by these large systems. The demand for higher load current is caused by improved performance and increased functionality of electronic systems. The difficulty of supplying sufficient current is aggravated by the relatively low supply voltages demanded by many circuits, particularly digital circuits. Thus, high current loads are often supplied by several power supplies connected in parallel.

The use of multiple parallel power supplies can improve system reliability, compared with the use of a single high current output power supply, particularly when the number of parallel power supplies used exceeds the minimum number needed by at least one, because failure of a single power supply need not cause the entire system to shut down.

It is frequently useful to monitor the current drawn by an electronic system, in order to track power output. Monitoring the current level may be used to protect the power system, for example by tripping a circuit breaker if the current drawn is excessive. Typically, current is monitored, and electronic circuit breakers implemented, using a sense resistor to sense the current through a conductor, or alternatively using a Hall Effect device. If the current becomes excessive, a breaker may be tripped. A disadvantage to these approaches to monitoring current and protecting the power system is that each requires the addition of circuitry to the power supply system. Additionally, the voltage drop across the sense resistor results in both a power loss and an error in the output voltage.

It is therefore desirable to provide a method for monitoring current in a parallel power supply system, and potentially triggering a circuit breaker, that does not require additional circuitry, and does not result in an output voltage error.

SUMMARY OF THE INVENTION

In summary, the present invention is a system and method for monitoring current and protecting a power supply system from excessive current loading using the error voltage generated by current share controller devices in the power supply system. This error voltage is used by a central processing unit (CPU), along with a signal indicating the total number of power supplies, to calculate the total current supplied by the power supply system.

Current share controller devices are used in power supply systems to balance the load current among parallel connected power supplies. Each power supply in the distributed system is provided with a current load controller device. The power supply with the highest voltage is designated as the master. Its current load controller measures a small voltage across a current sense resistor and develops an error voltage that drives a "share bus." The error voltage on the share bus is monitored by all the other power supplies and used by them to control how much current they supply. Since all the power supplies are trying to match an internal error voltage with the error voltage on the share bus, they all supply substantially identical amounts of current, and therefore the load is balanced equally among the supplies.

The error voltage generated by the master power supply is proportional to the current drawn from the master power supply. Once the load is balanced, each power supply will have the substantially the same current drawn from it as the master supply. Therefore, the total current may be determined from the error voltage, when the number of power supplies in the system is known, without adding any additional circuitry for current monitoring.

The total number of power supplies may be determined by supplying a small current source along with each power supply, and connecting the current sources to a common bus. The current provided by each power supply is called the "device present" current. The total current on the "device present" bus—the "present current" —thus indicates how many power supplies are present. The error voltage from the share bus, and the current from the present bus, may be provided to a control circuit, that includes a CPU. The error voltage and present current signal may be converted to digital signals using an analog-to-digital converter, and provided to the CPU. Using the present signal, the CPU calculates the total number of power supplies present. Using the error voltage signal and the current gain for the share load controller, the CPU calculates the current per power supply. The CPU then calculates the total current using the current per power supply and the number of power supplies present. The CPU thus is capable of monitoring the total current in the system. If the total current exceeds some predetermined threshold, a circuit breaker can be triggered by the CPU, shutting down the power supplies.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
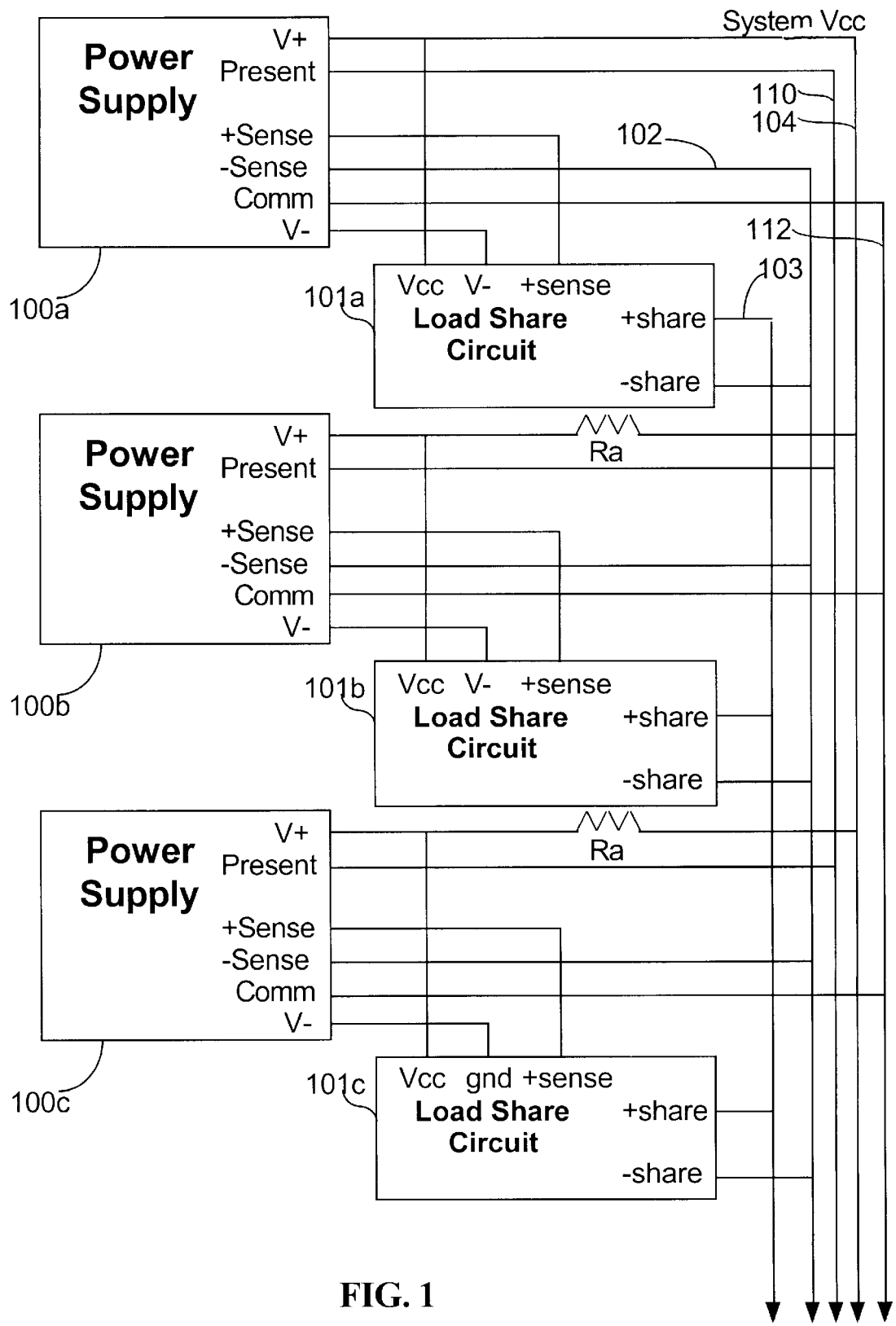
FIG. 1 is a block diagram of a distributed power supply system with load share control.

In the present invention, current for a distributed power supply system is monitored, and the ability to trigger a circuit breaker is provided, using an error voltage generated by a current load share controller. A block diagram of a distributed power supply system with current load share control is shown in FIG. 1. Each power supply 100 is provided with a load share controller circuit 101. The output voltage for each supply 100 is connected to a system Vcc bus 104. Each load share circuit 101 is connected to power and ground for the power supply, to the power supply's voltage adjust inputs +sense and −sense, and to a shared bus 102/103. Each load share controller circuit 101 measures the current output of the power supply 100 with which it is associated, and adjusts the sense input of the power supply 100 to provide equal load sharing.

Each power supply 100 also outputs a low-level "device present" current from a current source for monitoring the presence of the power supply in the system. This low-level current is provided to a "present" bus 110, that combines the "device present" currents from all the power supplies. The total current on the present bus thus indicates the number of power supplies present (and active) in the system.

Each power supply is also coupled to a communications bus 112, enabling a control board or other device to communicate with the power supply and send it commands.

Figure 2:
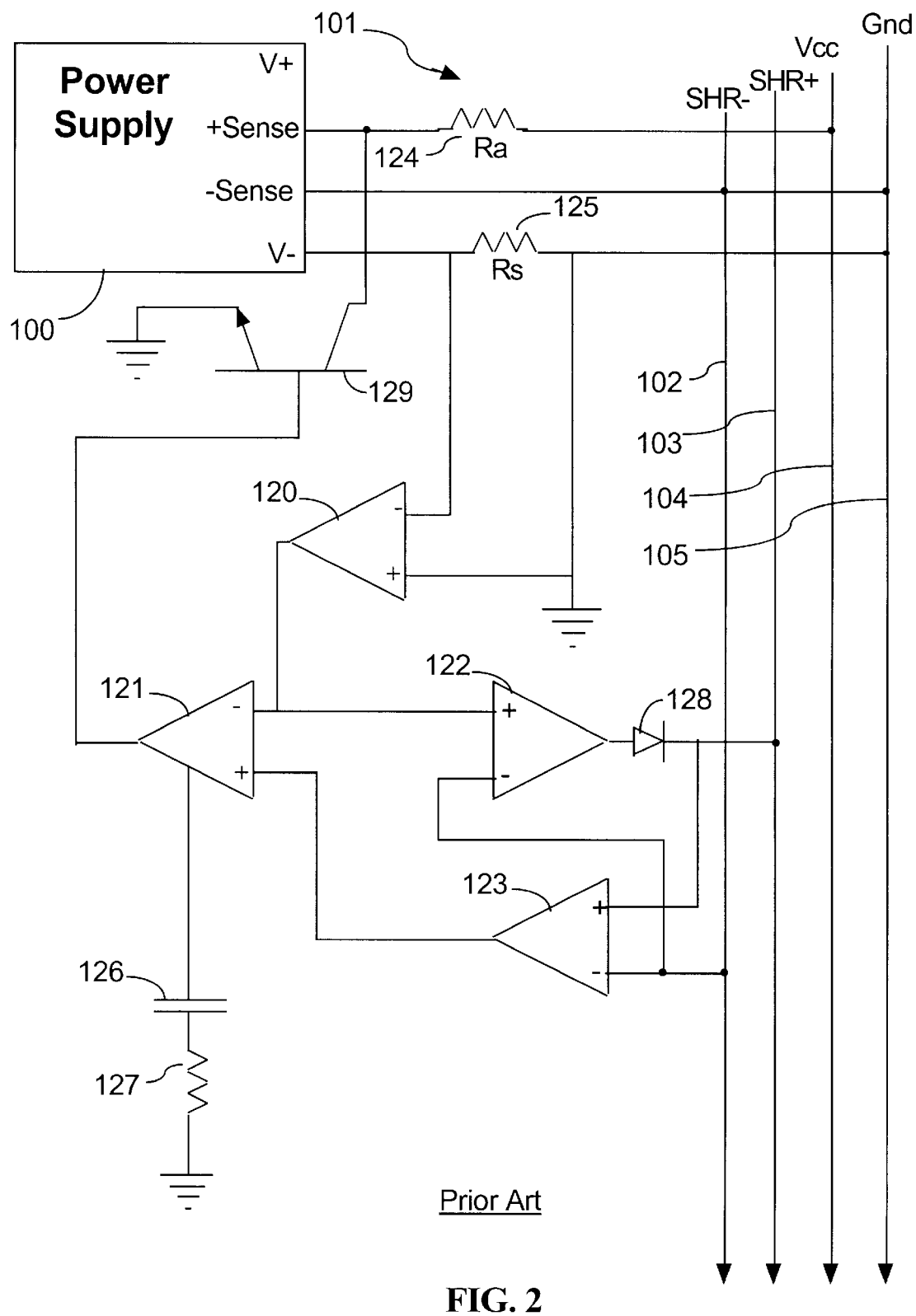
FIG. 2 is a block diagram of an exemplary current share controller circuit connected to a power supply and a share bus.

FIG. 2 is a block diagram of a load share controller circuit 101 connected to a power supply 100. An exemplary load share controller is the UC3902 manufactured by Texas Instruments (formerly by Unitrode), described in Unitrode data sheet UC3902 and application note U-163, the contents of which are hereby incorporated by reference. In FIG. 2, the differential share bus 102/103 is driven by share driver amplifier 122, which in turn is driven by an inverting current sense amplifier 120. The negative and positive inputs of the current sense amplifier 120 are separated by a sense resistor $R_s$ 125 in the V- ground connection of the power supply 100.

The power supply with the highest output voltage is automatically designated the master power supply. In particular, each of the power supplies attempts to drive the share bus 102/103 with an internally generated error voltage that is proportional to the current provided by that power supply, and also monitors the share bus 102/103 to see if any other power supply is driving an even higher error voltage onto the share bus 102/103. If a power supply detects a higher error voltage on the share bus 102/103 than its own internally generated error voltage, that means this power supply is a slave and one of the other power supplies is the master power supply. The output of the share driver amplifiers 122 of the slave power supplies is automatically disconnected from the share bus 103 by diodes 128, because the master power supply will output the highest voltage and thus control the voltage on share bus 103.

The share bus 102/103 in turn drives the share sense amplifier 123 of each power supply. The share sense amplifier 123 thus measures the voltage on the differential share bus 102/103. The output voltage of the share sense amplifier 123 for any particular power supply corresponds to the difference between the output current of the master power supply (with the highest output current) and the output current of this particular power supply. The share sense amplifier 123 drives the positive input of amplifier 121 for adjusting the power supply output, and the current sense amplifier drives the negative input of amplifier 121. The difference between the error voltage of the master supply, and the voltage reflecting the current output by power supply 100 is output by amplifier 121. Amplifier 121 drives the base of transistor 129, and the collector of transistor 120 in turn drives the adjustment (+sense) input of the power supply 100. Adjustment resistor 124 power $V_{cc}$ and the collector of transistor 129. The error voltage defines the current that flows through the resistor 124, and causes a voltage drop across the resistor 124, which forces the power supply 100 to increase its output voltage. As a result, the power supply's current level increases until it matches the current level of the master power supply.

Figure 3A:
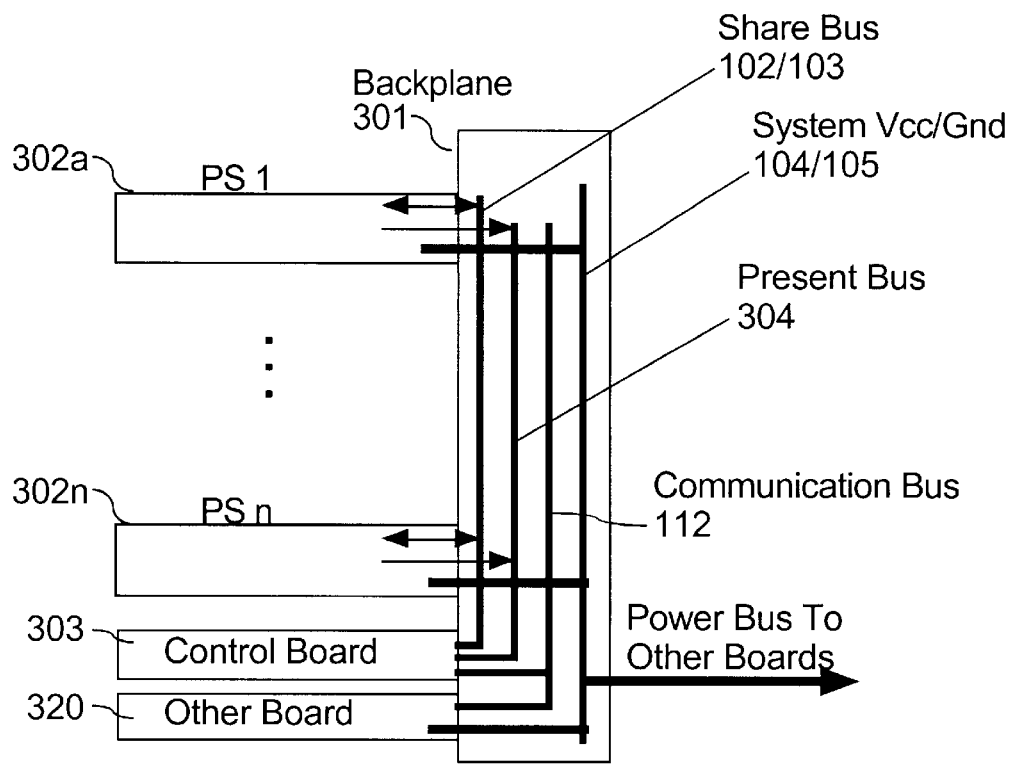
FIG. 3a is a connectivity diagram of a system having multiple parallel power supplies and a control circuit to determine the number of active power supplies, total drive current, and whether or not an over current condition exists.

As shown in FIG. 3a, the power supply system includes a plurality, n, of parallel power supply boards 302, and a control board 303. In a typical configuration, the boards will be inserted into a backplane 301 that includes the share bus lines 102/103 carrying the error voltage, a bus for the system Vcc and ground 104/105, and the present bus 304, as well as a communication bus 112.

Figure 3B:
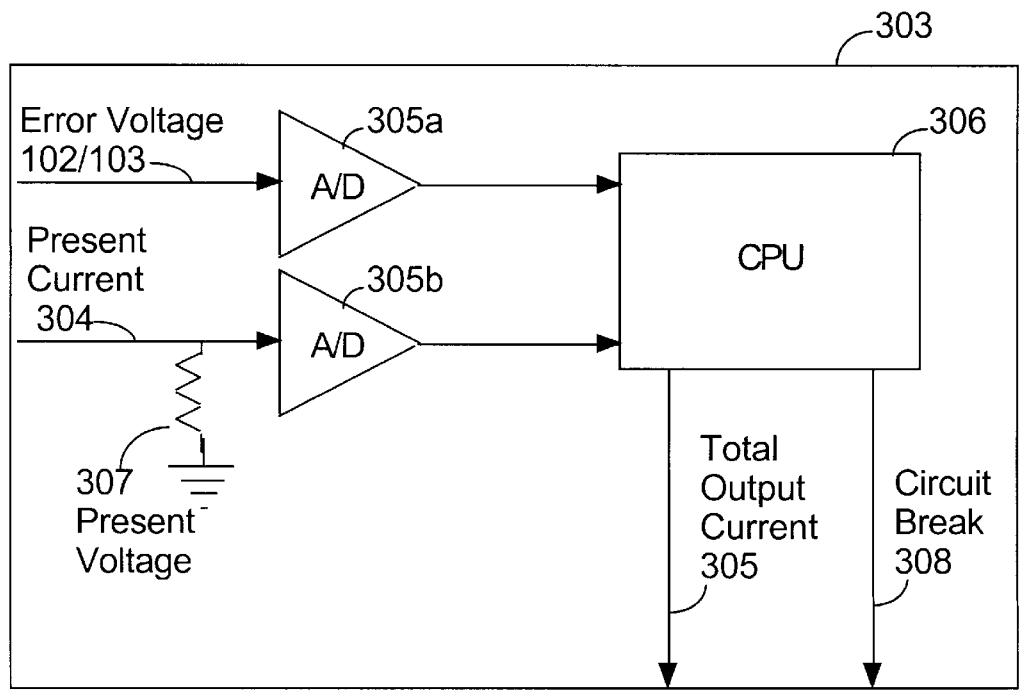
FIG. 3b is a block diagram of the control circuit.

FIG. 3b is a block diagram of the control board 303. The control board 303 receives the error voltage carried on the share bus 102/103, and the total present current carried on the present bus 304. The total present current is converted to a voltage by resistor 307 connected between the present bus and ground. The resulting voltage, like the total present current, is proportional to the number, n, of active power supplies in the distributed power system. The two analog signals —the error voltage and the voltage representing the current on the present bus —are converted to digital form using analog to digital converters 305, providing a digital error signal and a digital present signal. Analog to digital conversion may be provided by two separate analog-to-digital converters, or by a single converter with multiplexed inputs and outputs. Conversion is preferably provided by one or more analog to digital converters embedded in CPU 306. The CPU 306 processes the digital signals, as discussed below, and produces a digital output indicating the total current provided by the power supply system, and optionally a "circuit breaker" output signal 308 that instructs the power supplies to shut down when excessive current is drawn. The circuit breaker output signal 308 is preferably conveyed by the communication bus 112 to other boards in the system.

The CPU 306 processes the digital error signal and the digital present signal to calculate the total current as follows. The number of power supplies is proportional to the current on the present bus, and is equal to the current on the present bus 304 divided by the current provided by the small current source on each power supply board 302. The voltage applied to the input of the analog-to-digital converter 305b is equal to the current on the present bus 304 multiplied by the value of resistor 307. Therefore, the CPU 306 calculates the number of power supplies by dividing the digital present signal by the value of resistor 307 and by the current provided by the small current source on each power supply board.

The total current is equal to the number of power supplies multiplied by the current per power supply. Returning to FIG. 2, once the system has reached equilibrium and all power supplies are sharing the load equally, the error voltage on the share bus 102/103 is proportional to the current per power supply. Therefore, the CPU 306 determines the total current drawn by the power supply system by dividing digital error signal by the gain of the current sense amplifier 120, and multiplying by the number of power supplies in the system, calculated as described above from the current on the present bus. Furthermore, if the total current exceeds some predetermined threshold, the error voltage corresponding to that maximum current is used to trigger an electronic circuit breaker, again without any additional circuitry. The CPU 306 simply monitors the total current and when it exceeds the predetermined maximum, outputs a circuit breaker signal 308 to a circuit breaker.

This approach, using the error voltage generated by the current share controller and monitoring the number of supplies by including a small current source with each, advantageously allows the total current to be monitored with no additional circuitry. An additional advantage is that, unlike prior art methods for monitoring current, this method generates no error in the output voltage, since the output voltages are being brought into proximity by the error voltage.

Figure 4:
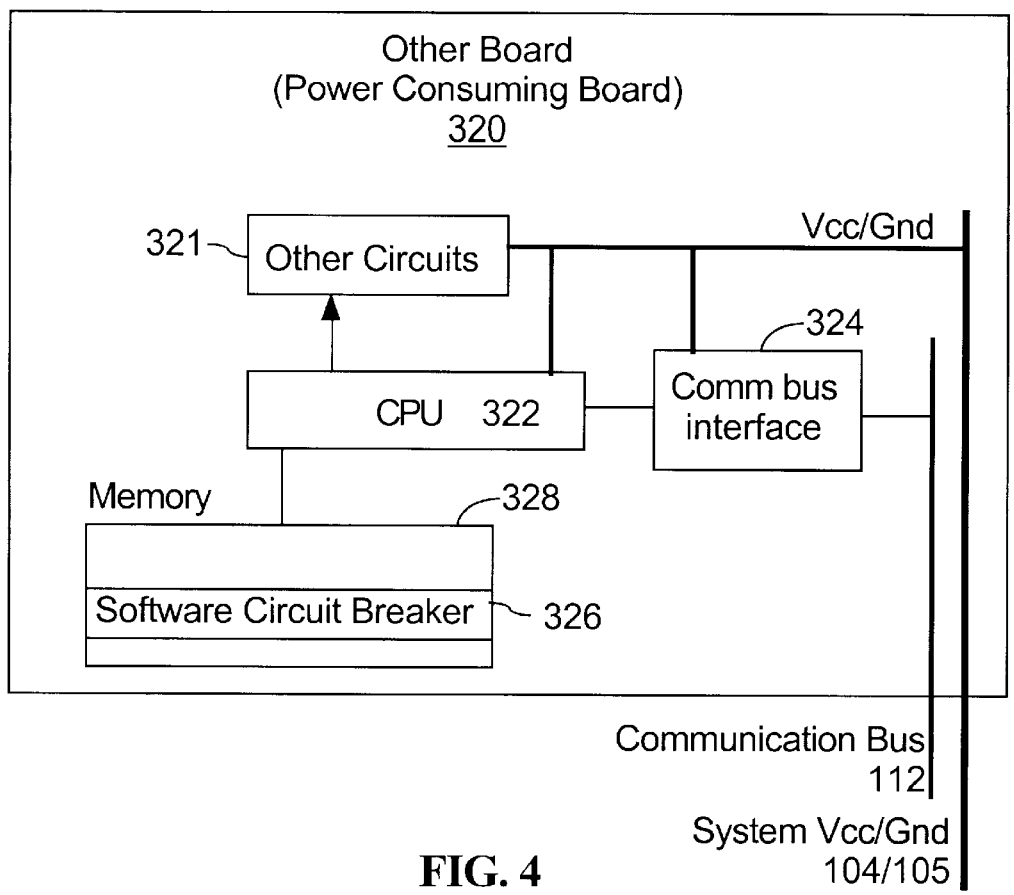
FIG. 4 is a block diagram of power consuming circuit board having a software circuit breaker responsive to a circuit break signal from the control circuit.

Referring to FIG. 4, the current break signal may be transmitted over the communications bus 112 and received by another board 320, such as a board having circuits 321 that consume some of the current generated by the power supplies. In the board 320 Of FIG. 4, a programmable processor 322 (CPU ) receives the circuit breaker signal with the assistance of a communication bus interface 324. The CPU 322 executes software 326 stored in a memory 328, including software for detecting the receipt of the circuit breaker signal. Upon detecting the receipt of the circuit breaker signal, the CPU 322 shuts off the other circuitry 321 using its circuit breaker software 326.

Figure 5:
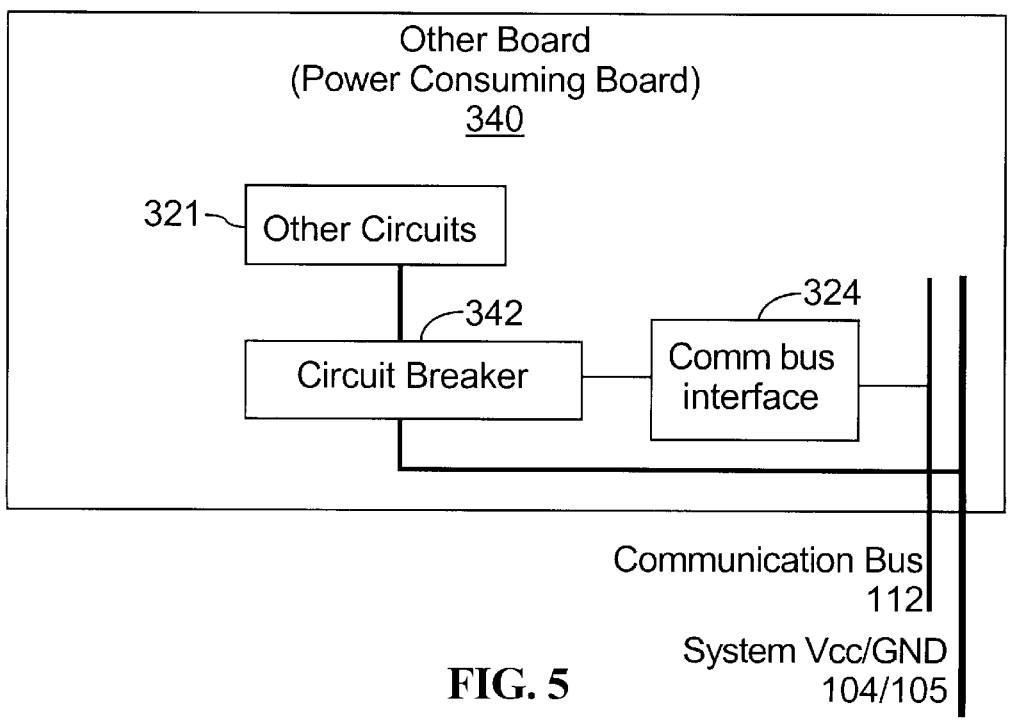
FIG. 5 is a block diagram of power consuming circuit board having a hardware circuit breaker responsive to a circuit break signal from the control circuit.

FIG. 5 shows another circuit board 340 that is responsive to the circuit breaker signal. In this case, however, the board 340 includes a hardware circuit breaker 342 that is responsive to the circuit breaker signal, received via a communication bus interface 324. When the circuit breaker signal is received, the circuit breaker 342 cuts off the power supply connection to the other circuit 321. In an alternate embodiment, the circuit break signal may be conveyed directly to other boards in the system, eliminating the need for a communication bus interface 324.

While the present invention has been described with reference to a few specific embodiments, the description is illustrative of the invention and is not to be construed as limiting the invention. For example, different load share controller designs may be used, with different internal circuitry and different connections to each power supply. The load share controllers may operate as peers, instead of using a master-slave arrangement.

What is claimed is:

1. A method for monitoring current in a distributed power supply system consisting of a number of parallel power supplies, comprising the steps of:

extracting an error voltage from a current load share control device;

receiving a "device present" current associated with each power supply;

combining the "device present" current from each power supply to obtain a total present current;

calculating the number of power supplies from the total present current dividing the error voltage by a current gain to determine an output current per power supply; and multiplying the output current per power supply by the number of power supplies to determine a total output current.

2. The method of claim 1, further comprising:

triggering a circuit breaker when the total output current exceeds a predetermined threshold.

3. A distributed power supply system with automatic current control, comprising:

a plurality of power supplies connected in parallel, each power supply including a "device present" current output, the "device present" current output for each power supply driving a present current bus;

a current share controller device connected to the power supplies, the current share controller device driving a share bus;

at least one analog to digital converter device with a first input connected to the present current bus, a first output providing a digital present signal, a second input connected to the share bus, and a second output providing a digital error signal;

a central processing unit for receiving and processing the digital present signal and the digital error signal, and providing a computation of the total current output by the distributed power supply.

4. The system of claim 3 wherein the central processing unit outputs a circuit break signal when the total current output exceeds a predetermined threshold.

5. The system of claim 3 wherein the at least one analog to digital converter device is embedded in the central processing unit.

6. The system of claim 3 further comprising a circuit breaker connected to the circuit break signal.

7. The system of claim 6, wherein the circuit breaker comprises a programmable processor that receives the circuit break signal and turns off a device in response.

* * * * *